United States Patent
Knabe et al.

(10) Patent No.: US 11,845,338 B2
(45) Date of Patent: Dec. 19, 2023

(54) METHOD FOR OPERATING A PISTON ENGINE, AND PISTON ENGINE

(71) Applicant: Rolls-Royce Solutions GmbH, Friedrichshafen (DE)

(72) Inventors: Helmut Knabe, Friedrichshafen (DE); Horst Weidele, Meersburg (DE); Aron Toth, Friedrichshafen (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 514 days.

(21) Appl. No.: 17/123,907

(22) Filed: Dec. 16, 2020

(65) Prior Publication Data
US 2021/0101468 A1 Apr. 8, 2021

Related U.S. Application Data

(63) Continuation of application No. PCT/EP2019/066316, filed on Jun. 20, 2019.

(30) Foreign Application Priority Data

Jun. 22, 2018 (DE) ...................... 10 2018 115 082.2

(51) Int. Cl.
*B60K 6/485* (2007.10)
*B60W 10/08* (2006.01)
(Continued)

(52) U.S. Cl.
CPC ............. *B60K 6/485* (2013.01); *B60W 10/06* (2013.01); *B60W 10/08* (2013.01); *B60W 20/40* (2013.01);
(Continued)

(58) Field of Classification Search
CPC ....... B60K 6/485; B60W 10/06; B60W 10/08; B60W 20/40; B60W 2510/0657;
(Continued)

(56) References Cited

U.S. PATENT DOCUMENTS

| | | | |
|---|---|---|---|
| 4,922,869 A | 5/1990 | Kadomukai et al. | |
| 5,546,793 A | 8/1996 | Gimmler et al. | |

(Continued)

FOREIGN PATENT DOCUMENTS

| | | |
|---|---|---|
| DE | 600 37 612 T2 | 1/2009 |
| EP | 2 673 594 B1 | 2/2016 |

(Continued)

OTHER PUBLICATIONS

International Search Report and Written Decision from the International Searching Authority dated Oct. 1, 2019 for International Application No. PCT/EP2019/066316 (16 pages).

(Continued)

*Primary Examiner* — Richard M Camby
(74) *Attorney, Agent, or Firm* — Taylor IP, P.C.

(57) ABSTRACT

A method for operating an internal combustion engine. The method includes providing a piston engine. The piston engine includes a crankshaft and a torque sensor system. The torque sensor system includes at least one first rotary angle sensor and at least one second rotary angle sensor. The method further includes measuring a first and a second rotary angle in a spacing region and determining an angular offset between the first and the second rotary angle. The angular offset results from the torsion of the loaded crankshaft wherein the spacing region is limited along the crankshaft to an actual partial region of the spacing between the bearing journals. The partial region includes an actual subgroup of at least one of the number of offsets and the number of shaft journals, so that the angular offset is assigned to the actual subgroup.

24 Claims, 9 Drawing Sheets

(51) Int. Cl.
*B60W 10/06* (2006.01)
*B60W 20/40* (2016.01)

(52) U.S. Cl.
CPC ........... *B60W 2510/0657* (2013.01); *B60W 2510/0685* (2013.01)

(58) Field of Classification Search
CPC .......... B60W 2510/0685; F02D 35/028; F02D 41/009; F02D 2200/1002; F02D 41/1497; G01L 3/104; G01L 3/109
See application file for complete search history.

(56) References Cited

U.S. PATENT DOCUMENTS

| | | |
|---|---|---|
| 5,771,482 A | 6/1998 | Rizzoni |
| 6,131,547 A | 10/2000 | Weber et al. |
| 6,453,864 B1 | 9/2002 | Downs et al. |
| 6,732,709 B1 | 5/2004 | Havran et al. |
| 2017/0241357 A1 | 8/2017 | Martin et al. |
| 2017/0356353 A1* | 12/2017 | Rollinger ................ F02D 13/06 |
| 2017/0356367 A1* | 12/2017 | Glugla ................ F02D 41/0087 |
| 2017/0356375 A1* | 12/2017 | Glugla .............. B60W 30/1882 |
| 2018/0087459 A1 | 3/2018 | Hagari et al. |
| 2020/0277908 A1* | 9/2020 | Glugla ................ F16H 61/0213 |

FOREIGN PATENT DOCUMENTS

| | | |
|---|---|---|
| JP | 2003-65136 A | 3/2003 |
| WO | 99/54697 A2 | 10/1999 |
| WO | 2007/001255 A1 | 1/2007 |

OTHER PUBLICATIONS

"Mass inertia-free measuring system for angle and speed measurement in highly dynamic drives", by Dr. Rolf Sattler, Sensitec GmbH, published in Konstruktion (Construction) p. 2—2016, Publisher: Springer (3 pages).

* cited by examiner

METHOD FOR OPERATING A PISTON ENGINE, AND PISTON ENGINE

CROSS REFERENCE TO RELATED APPLICATIONS

This is a continuation of PCT application No. PCT/EP2019/066316, entitled "METHOD FOR OPERATING A PISTON ENGINE, AND PISTON ENGINE", filed Jun. 20, 2019, which is incorporated herein by reference.

BACKGROUND OF THE INVENTION

1. Field of the Invention

The invention relates to a method for operating a piston engine, in particular an internal combustion engine, and in particular to a method for operating a piston engine with an electric machine, in particular a generator or a motor, for example a hybrid drive. The piston engine has a number of cylinders and a crankshaft which is mounted in main bearings and has a number of offsets and shaft journals which—by way of torque being applied to the crankshaft—convert a movement of a piston in one of the cylinders of the number of cylinders by way of a piston connecting rod that is attached on an offset of the cranks shaft into a rotational movement, under torsion-related deformation of the crankshaft to which torque was applied. The piston engine moreover comprises a torque sensor system assigned to the crankshaft, having at least one first and one second rotary angle sensor. The invention further relates to a corresponding piston engine.

2. Description of the Related Art

In an internal combustion engine, a torque can be periodically calculated from theoretical values of the cylinder fillings which in turn are determined from theoretical values of injection volumes provided by the fuel injectors which are stored in the engine control unit (ECU). Determined by the design, the fuel injectors on the one hand display a certain variation, and on the other hand exhibit a drift as a result of their aging. An engine control which is based on the calculated torque therefore occurs on the basis of a theoretical torque as the input value. This may deviate from the actual torque, as a result of which the engine control becomes possibly compromised.

If the engine control of the internal combustion engine occurs on the basis of a computationally determined torque, an improvement of the engine control would thus be closely linked with the method of the computational determination of the torque.

In electric machines however, the torque can for example be calculated directly from the electric performance data. On the one hand, these are not suitable for status monitoring or preventative maintenance or early defect detection since suitable input values cannot be determined sufficiently accurately; as for example, the input variable of a primary energy for wind or hydro power.

In internal combustion engines, the metrological determination of the torque is even more difficult, so that in the state of the art many different approaches prevail for determination of the crankshaft torque. Thus, various realizations of torque determination are proposed, which serve primarily to determine a usable crankshaft torque and which, among other factors rely on strain gauges (DMS).

In addition, particular interest is found in the metrological determination of a torque corresponding to a specific cylinder, as a contribution toward the total torque, since this can vary from cylinder to cylinder.

Moreover, due to a defect on a cylinder in contrast to an adjacent cylinder, a significant difference can arise in the cylinder-specific torque contribution to the usable torque, and also considerable internal torques can be present in the form of torque loads or twist in the crank shaft.

WO 2007/01255 A1 describes a method for operating an internal combustion engine, wherein cylinder-specific torques are calculated by way of modeling—that is on a purely theoretical basis. Rotational characteristic variables are calculated at a first and a second end, along a crankshaft. A rotational characteristic variable is herein understood to be an angle position, an angle velocity, or a torque value along one section of the shaft. The first location is preferably a first end of the shaft. From the angular acceleration, a moment of inertia of the rotating masses, a torque of the oscillating masses and a friction torque an effective torque which acts of the output side of the shaft, is determined by referring to a characteristics diagram which is stored in the control unit and which was previously compiled by way of load tests at various speeds and loads. A gas torque progression is modeled with the assistance of the effective torque, and cylinder-specific rotational characteristic variables are determined from the gas torque progression.

The model based, in other words the purely theoretical method for determining cylinder-specific torques described in WO 2007/01255 A1 also has the disadvantage that, by taking into account the first rotational characteristic variable and the second rotational characteristic variable, a third rotational characteristic variable is determined that is characteristic for the entire internal combustion engine. The cylinder-specific rotational characteristic variables are determined from a model representing the internal combustion engine. The input values of the models are based on the first rotational characteristic variable and the third rotational characteristic variable. Thus, the engine control continues on the basis of the model torque input values and does not permit reliable statements in regard to cylinder-specific torques, in particular in regard to the state of specific cylinders, for example in regard to a cylinder defect. In order to use the determined torques as input values for engine control, for example to control the fuel injection, a substantially more accurate method is required which is based on actual measured values.

In the article "Mass inertia-free measuring system for angle and speed measurement in highly dynamic drives", by Dr. Rolf Sattler, Sensitec GmbH, published in Konstruktion (Construction) page 2-2016, Publisher: Springer, the method described initially only addresses the angle position and rotational speed of highly dynamic rotating components. However, a basically interesting description provides that the motor shaft itself is used as a material measure for a rotor position sensor. This must however be made possible by a tooth sensor which is based on the GMR (Giant Magnetoresistive) effect and scans a tooth-like profile which is incorporated directly into the motor shaft. For this purpose, a GMR sensor chip is attached to a support magnet and is mounted above the tooth structure. With this arrangement, changes in the magnetic field can be detected with high precision over a wide dynamic range.

WO 99/54697 describes a device for detection of the torque acting upon a rotatable shaft, wherein two components which are connected with the shaft and which have a selectable structure and which move relative to one another under the influence of a torsion caused by the torque are scanned by a single sensor. From the output signal supplied by the sensor, a square wave signal or digital signal is formed whose ratio of pulse length relative to total pulse length is compared with the duty cycle in the case of an unloaded shaft. The duty cycle change compared to unloaded shaft is proportional to the torque and is evaluated to determine the torque.

EP 2 673 594 B1 describes a method and a device for implementing the method for detecting the angle of torsion of a shaft and/or a torque occurring at the shaft. The described method herein uses two inductive sensors, by way of which an angle of rotation is determined in each case by comparison with a reference sample. The angle of torsion of the shaft is again determined from the difference between the two angles of rotation.

The aforementioned methods and devices in fact imply elimination of a standard rotational speed determination on the flywheel, since the rotational speed of the crankshaft can be calculated computationally. It is nevertheless desirable to provide a method which above all permits determination of torque loads or a twist in the crankshaft and which is in particular practical for monitoring or early defect detection, and which in addition improves engine control on the basis of reliably determined usable torques.

What is needed in the art is a method which simplifies the sensor system and which is nevertheless reliable.

SUMMARY OF THE INVENTION

The invention provides a method and a device by way of which a piston engine can be operated in an improved manner on the basis of reliably determined torques. This relates in particular to a torque load or a "twist" in a crankshaft. The invention advantageously provides early defect detection as a consequence of the reliably determined torque loads, in particular of internal torques of a crankshaft. A piston engine is also intended to be operable in an improved manner, on the basis of reliably determined torques, in particular synergistic also on the basis of the usable torques, in particular external torques of a crankshaft. An engine control should also be advantageously improved. It is intended in particular to provide continuous status monitoring during operation of a piston engine.

The invention relates to a method for operating a piston engine, in particular an internal combustion engine, and in particular to a method for operating a piston engine with an electric machine, in particular a generator or a motor, for example a hybrid drive. The piston engine includes:
  a number of cylinders, and
  a crankshaft mounted with bearing journals in main bearings, which furthermore has a number of offsets and shaft journals in alternating sequence between the bearing journals, wherein
  the crankshaft converts a movement of at least one piston in one cylinder of the number of cylinders through absorption of the load by at least one piston connecting rod which is arranged on an offset of the crankshaft, into a rotational movement, and wherein
  due to the load absorption, the crankshaft experiences a torsion causing deformation and/or tension, and wherein
  the piston engine also has a torque sensor system assigned to the crankshaft, that has at least one first and one second rotary angle sensor.

The torsion causing deformation and/or tension can load the crankshaft in particular dynamically and/or through oscillation, so that same becomes twisted. The crankshaft can moreover become bent, stretched, or compressed or become deformed and/or strained in a similar manner which, as a result can also contribute to torsion.

According to the invention, it is provided in the method that:
  the first and the second rotary angle sensors are magnetosensitive, in particular magnetoresistive and/or magnetoelastic and are part of a number of rotary angle sensors which are spaced apart from one another and measure a first and second rotary angle of torsion directly of a crankshaft in such a way that
  the first and second rotary angle sensor are spaced apart from one another over a spacing region of the crankshaft, wherein
  the first and second rotary angle are measured in the spacing region, and
  an angular offset is determined between the first and second rotary angles, which angular offset results from the torsion of the loaded crankshaft, and
  the spacing region between the first and the second rotary angle sensor is limited along the crankshaft to an actual partial region of the spacing between the bearing journals, and
  the partial region comprises an actual subgroup of the number of offsets and/or shaft journals, so that the angular offset is to be assigned to the actual subgroup of the number of offsets and shaft journals.

The invention also relates to a corresponding piston engine. The piston engine, in particular a piston engine with an electric machine, in particular a generator and/or a motor, in particular a hybrid drive. The piston engine includes a number of cylinders and a crankshaft mounted with bearing journals in main bearings, which furthermore has a number of offsets and shaft journals in alternating sequence between the bearing journals. The crankshaft converts a movement of at least one piston in one cylinder of the number of cylinders through absorption of the load by at least one piston connecting rod which is arranged on an offset of the crankshaft, into a rotational movement. Due to the load absorption, the crankshaft experiences a torsion-causing deformation and/or tension. The piston engine also has a torque sensor system assigned to the crankshaft, that has at least one first and one second rotary angle sensor. The first and the second rotary angle sensors are magnetosensitive sensors and are part of a number of rotary angle sensors which are spaced apart from one another and measure a first and second rotary angle of torsion directly of the crankshaft in such a way that the first and second rotary angle sensor are spaced apart from one another over a spacing region of the crankshaft, The first and second rotary angle can be measured in a spacing region, and an angular offset can be determined between first and second rotary angle, which angular offset results from the torsion of the loaded crankshaft. The spacing region between the first and second rotary angle sensor is limited along the crankshaft to an actual partial region of the spacing between the bearing journals. The partial region includes an actual subgroup of the number of offsets and/or shaft journals, so that the angular offset is to be assigned to the actual subgroup of the number of offsets and shaft journals.

The invention is based on the consideration that the crankshaft during operation of a piston engine is subject to torsion due to its elasticity, as a result of deformation and/or stain. This can best be detected, particularly reliably also over a wide dynamic range, via sensors. An internal torque, characterizing the torsion (or twist) can be initially determined from the angular offset determined by the sensors;

and from that the usable torque of the crankshaft can be determined, preferably computationally. To this end it is to be expected that the internal torque along the crankshaft varies due to the staggered operating cycles of the cylinders. Damage, for example on specific cylinders of the torque-loaded crankshaft can lead to different torques along the crankshaft.

Consequently, accurate knowledge in regard to torsion distribution along the crankshaft is of great interest, since a usable torque is based thereupon, and the engine control of a piston engine can consequently be improved. A cylinder-specific improvement and control of the fuel injection is herein of increased interest.

In a method according to the state of the art, the torque is determined regularly directly at the crankshaft, however, ultimately this torque corresponds with the sum of specific cylinder-associated torques; in other words only with an estimated usable torque. A twist or internal torque of the crankshaft is not detected. However, in current solutions it is also not provided that several (in this respect internal) torques along the crank shaft are determined on the basis of actually measured values and to use the determined torques for continuous status monitoring during operation of the piston engine, or to utilize same for improvement of control tasks or for early defect detection.

Attempts to provide the cylinder-associated torques for improved engine control have hitherto been limited only to modeling of the cylinder-associated torques. Modelling is herein based on a few torques determined through rotary angle measurements. Consequently, there is no method known to date for engine control on the basis of cylinder-associated torques which are determined from actually measured values. Moreover, no continuous monitoring of the piston engine on the basis of continuously determined and cylinder-associated torques is provided. However, status monitoring is of great interest, since in addition to other factors, control tasks, for example control of the injection volume can be improved.

The invention is based on the knowledge that an improvement in engine control is made possible by an improved determination of the torque via cylinder-specific sensors. In this way, cylinder-associated torques are to be determined so that the engine control occurs based on actual torques and not as in current solutions, based on theoretical or model-based torques.

The first and second rotary angle sensor are spaced apart from one another over a spacing region of the crankshaft and are assigned to said spacing region of the crankshaft. The spacing region along the crankshaft which is limited to a partial region accordingly comprises a subgroup of the number of offsets and shaft journals. A corresponding sub-group thus includes a smaller number of offsets and shaft journals than the overall length of the crankshaft which extends between the main bearings. The first and second rotary angle sensor which are allocated to the spacing region, are thus associated with a smaller number of offsets and shaft journals than the number of offsets and shaft journals assigned of the entire crankshaft.

A cylinder-associated torque herein may be determined continuously by way of several sensor for each cylinder during operation of the piston engine, so that the engine control of a piston engine occurs on the basis of measured input variables. Compared to the prior state of the art, the engine control no longer occurs based on theoretically determined torques but is based on the actual cylinder-associated torques as determined by sensors.

According to the invention at least two sensors are assigned herein to the at least one cylinder, wherein at least one offset of the torque-loaded crankshaft is positioned between the two sensors. An offset is understood to be a part of the crankshaft on which the piston connecting rod bearing is located; in other words, an offset in the crankshaft is part of the crankshaft that is arranged between two shaft journals. An offset herein includes two arms and one crank journal. For example, at least two sensors are assigned to at least one cylinder, wherein between the two sensors one offset of the torque-loaded crankshaft may be arranged; in other words, each of the sensors are arranged on or above the two adjacent shaft journals of the offset.

According to the concept of the invention, the first and second rotary angle sensor are magneto-sensitive, in particular magneto-resistive and/or magnetoelastic sensors which enable precise detection of an angular offset of the first and the second rotary angle sensor through a change in a magnetic field as a result of a tension and/or torsion of the torque-loaded crankshaft. A magnetosensitive sensor is generally understood to be a sensor which senses a magnetic field change or reacts to a magnetic field change. Above all, a magnetoresistive sensor has proven to be advantageous. Nevertheless, a magnetoelastic sensor which senses a magnetic field change is also suitable due to the magnetoelastic effect, in particular the magnetostrictive effect or the inverse magnetostrictive effect.

A determined angular offset can be assigned to the sub-group of the number of offsets and shaft journals. The subgroup of the number of offsets and shaft journals herein includes the number of offsets and shaft journals which are located in the spacing region between the first and the second rotary angle sensor. The determined angular offset can thus be assigned to a partial region of the distance between the main bearings, which is defined by the spacing region between the first and second rotary angle sensor.

By way of the proposed arrangement of two magneto-sensitive, in particular magnetoresistive and/or magnetoelastic rotary angle sensors per offset, a cylinder-associated distribution of the torsion-induced load on the crankshaft during operation of the piston engine can be determined. It is of special interest herein, that the knowledge in regard to cylinder-specific torques can be used in order to improve the engine control during operation of the piston engine. Of special interest is herein the optimization of the fuel injection. The method according to the invention is also suitable for status monitoring of the piston engine during operation of the piston engine.

The invention has the advantage that, in particular at high speeds, a torsion-induced elastic deformation is provided which, at can be best detected—and even especially reliably over a large dynamic region—via sensors.

The invention is based moreover in the knowledge that the torques determined on the basis of the cylinder-associated sensors can be used for control tasks for engine control of the piston engine. This can be used advantageously for a reduction in pollutant emissions by controlling the injection volume. In addition, repeated determination of torques allows for continuous status monitoring of the piston engine. This can be used for example for predictive maintenance and early defect detection.

Further developments of the invention can be found in the sub-claims and provide specific advantageous possibilities to realize the concept discussed above within the scope of the objective, as well as in regard to additional advantages.

In one development a torque associated with the spacing region and resulting from the measured first and second rotary angle is measured by way of an offset calculator, wherein the torque assigned to the spacing region is determined, in particular repeatedly during running operation of the piston engine. The sensors respectively measure a rotary angle from which then an angular offset is determined by way of an offset calculator. A torque which is allocated to the crankshaft part—in other words the spacing region—between the two sensors is then calculated from the angular offset by way of the offset calculator.

Depending on the design of the engine, a torque assigned to a specific cylinder can be detected by way of the offset computer: in the case of an in-line engine, exactly one cylinder acts per offset, whereas in contrast in the case of a V-engine two cylinder per offset act. In the latter case, the time offset permits the cylinder-specific allocation of the angular offset determined by the offset calculator. A torque allocated to a specific cylinder can also be detected correspondingly by way of the offset computer in other types of engines, for example a double V-engine or a W-engine.

It is also conceivable to determine an angular offset that is assigned to more than one cylinder. This is possible in that the angular offset is calculated between rotary angles which were measured by rotary angle sensors between which several offsets are located.

In one further development it is provided that, for repeated determination of the torque that is assigned to the spacing region of the crankshaft, a torsion induced load on the crankshaft is detected continuously at least once per operating cycle of the cylinder.

Through repeated determination of the cylinder-associated number of torques it is possible to obtain a time-resolved torsion distribution along the torque-loaded crankshaft during running operation of the piston engine. The repeated measurement of the cylinder-associated rotary angle advantageously enables determination of a temporal progression of the cylinder-associated load on the crankshaft. Cylinder-associated torques are continuously computationally determined by the offset calculator from the measured rotary angles. This allows detection of performance data that corresponds with the real-time performance of the piston engine to be implemented. Knowledge of the real-time performance is of great interest since, as a result, the engine control during operation of the piston engine can be improved and negative influences can promptly be responded to. In particular, real-time monitoring of knocking, in other words of uncontrolled auto-ignition in gas combustion may be especially preferred. It is also conceivable that several operating cycles of the cylinder are interposed between repeated determination of the number of cylinder-assigned torques.

In one further development the spacing region is limited to a shaft journal region, comprising at least one shaft journal between a first and a second offset and/or an offset region comprising at least one offset in such a way that the angular offset can be assigned to the at least one shaft journal and/or to the at least one offset. The spacing region is arranged in particular between two adjacent offsets, so that between the first rotary angle sensor and the second rotary angle sensor a free length of the crankshaft is arranged, in particular a free part of the shaft journal of the crankshaft.

In one further development the spacing region is limited to a single region shaft journal, comprising a single shaft journal between a first and a second offset and/or a single region offset, comprising a single offset in such a way, that the angular offset can be assigned to the single shaft journal and/or the single offset. In particular, a single offset of the crankshaft is located in the spacing region, so that the first rotary angle sensor is arranged along the crankshaft before the corresponding offset, and the second rotary angle sensor is arranged along the crankshaft after the corresponding offset.

One further development provides a number of rotary angle sensors which include the first and second rotary angle sensor which are located spaced apart above the spacing region of the crankshaft, wherein the number of rotary angle sensors are magnetosensitive, in particular magnetoresistive and/or magnetoelastic sensors.

In one further development, the number of rotary angle sensors which are arranged spaced apart from one another includes a plurality of pairs of first and second rotary angle sensors between the main bearings, which are respectively spaced apart from one another over a single region, in particular shaft journal single region and/or offset single region of the crankshaft. In particular, additional sensors of the number of rotary angle sensors which are spaced apart from one another are allocated to corresponding additional spacing regions of the crankshaft. In particular, always two sensors of the number of spaced apart rotary angle sensors are respectively allocated to an additional spacing region of the crankshaft.

In a further development it is provided that due to repeated determination of a torque allocated to the spacing region by way of an engine control unit (ECU), continuous control and/or monitoring of the fuel injection is made possible. In particular, control and/or monitoring of the fuel injection into the cylinder is made possible which—by way of a piston connecting rod—is attached to an offset which is included in the spacing region or which adjoins the spacing region, in particular for reducing the pollutant emission of the piston engine and/or for permanent compliance with emission limits.

In addition to other control tasks, control of the injection volume over a large dynamic range is of particular interest, since this reduces the pollutant emission, thus being able to permanently comply with emission limits. Permanent adherence to environmental standards is thus made possible.

This method advantageously facilitates real-time monitoring of the combustion, which is advantageous in particular in regard to the occurrence of knocking in gas engines.

In a further development is it provided that a torque assigned to the spacing region is detected by one first and one second rotary angle sensor of the number of rotary angle sensors via repeated torque measurements during running operation of the piston engine, even at speeds of above 2000 rpm, in particular above 6000 rpm.

Detection of real-time output at high speeds and particularly over a great measuring range is not possible with the currently available solutions. The method according to the invention with two GMR sensors per offset is herein particularly advantageous.

A further development provides that always two rotary angle sensors are allocated to more than one offset, specifically, that every offset has assigned to it, two of the rotary angle sensors. Due to the fact that always two rotary angle sensors are assigned to several offsets of the crankshaft, a cylinder-associated torque can be determined for each of the offsets along the crankshaft, and thus establishing a torsion distribution along the crankshaft. Fuel injection into the individual cylinders can thus be advantageously controlled and adapted.

A further development provides that the crankshaft is not coded.

Due to the inherent surface structure of the crankshaft, a characteristic magnetic field is produced at each location which can be detected by highly sensitive sensors, for examples GMR sensors. At the same time, even the smallest changes in the magnetic field distribution which, for example arise from the elastic deformation of the crankshaft can be detected. Thus, coding of the crankshaft is not necessary. However, coding of the crankshaft can be used to intensify the changes in the magnetic field by loading of the torque loaded crankshaft.

A further development provides that more than two of the rotary angle sensors are assigned at a time to one offset.

The arrangement of respectively two offset-associated rotary angle sensors in such a way, that an offset of the torque-loaded crankshaft is located between the two sensors permits reliable and highly accurate angle measurements. The torsion induced elastic deformation is herein detected by way of an angular offset of both sensors relative to one another. A torque produced at individual cylinders can be calculated from this angular offset in a time resolved manner. Due to the high accuracy of the angle measurements, torques can be advantageously detected over an exceptionally large dynamic range.

The number of sensors per offset can be increased as desired. In order to measure a cylinder-assigned angular offset, at least two rotary angle sensors are however necessary per offset. In the event that only one rotary angle sensor is assigned to one offset, an angular offset can be determined with respect to an additional rotary angle sensor. The latter than is consistent with an averaging of several offsets.

In a further development it is provided that at least the rotary angle sensors (S1, S2) assigned to the spacing region are not in contact with the crankshaft, thus making a contactless determination of the rotary angles that are assigned to the spacing region possible.

This method can be implemented with the assistance of magnetosensitive rotary angle sensors, for example magnetoresistive rotary angle sensors, such as for example GMR sensors and offers great advantages over designs where sensors are in contact with the crankshaft. By using the crankshaft as a measurement standard for the measuring system, the crankshaft is being scanned by the sensors. Thus, an additional mass moment of inertia is eliminated by a measuring system which is attached directly on the crankshaft and which must always be accelerated or braked together with the crankshaft. The energy requirement is thereby reduced, and fuel is saved. Advantageously, the measuring system also functions more reliably at higher speeds than known solutions. Overall, the power electronics can be dimensioned smaller and, as a result of the elimination of additional components, in particular directly at the crankshaft, the entire system becomes more robust.

The sensors, in particular the GMR sensors can be mounted on support magnets which support the GMR sensors at a distance above the crankshaft. The GMR sensors can however also be mounted directly in the engine housing or on another engine component.

An additional development provides that at least the rotary angle sensors allocated to the spacing region are arranged directly on the crankshaft in contact with same.

For certain tasks, or depending upon availability of measuring sensor technology, or depending on space availability it can be advantageous to mount the rotary angle sensors directly on the crankshaft. A cylinder-associated determination of rotary angles and torques is also possible with this variation.

Another development provides, that the magnetoresistive sensors are in particular AMT sensors and/or Hall sensors and/or GMR sensors.

Compared to alternative sensors, GMR sensors are characterized by special advantages. A measuring system which is based on GMR sensors makes highly accurate rotary angle determination possible, even at very high rotational speeds. This characteristic is of immense significance, since targeted higher power densities, in particular in electric machines and associated with higher operational speeds.

In an additional development, the torque sensor system includes a magnetoelastic sensor, in particular magnetostrictive and/or inverse magnetostrictive sensors, which uses for example magnetostriction or inverse magnetostriction, that is, a change of magnetization due to mechanical tension and torsion.

An additional development provides that the torque sensor system includes additional sensors from the group consisting of torque flanges, strain gauges (DMS), magnetoresistor sensors and sensors having a magnetooptical layer.

Strain gauges are extensively used for determination of torques. These are however not durable over a long time period and require complex telemetry with energy supply for data transmission. Strain gauges often do not withstand demanding conditions, for example high temperatures. Mechanical, thermal, and chemical demands quickly challenge the limits of conventional solution. Strain gauges drop off or deliver insufficient data. In addition, signal transmission per telemetry is complex, very expensive and subject to defects.

Due to the measuring principle, magnetostrictive torque sensors are generally only suitable for high torques; idling and partial load torques up to approximately 60% can not be regularly detected. Attachable torque flanges can only determine torques at the respective output and are thus not suitable for engine control.

However, a combination of the aforementioned sensors with magnetosensitive, in particular magnetoresistive and/or magnetoelastic sensors is absolutely possible. It is however especially advantageous that cylinder-associated determination of torques is conducted via magnetosensitive sensors. However, strain gauges or torque flanges may for example be mounted at the beginning and/or at the end of the crankshaft.

A further development provides that the torque of the crankshaft is determined on the basis of the angle offset (also referred to as twist angle) which is determined by creating a difference between the first rotary angle measured by the first rotary angle sensor and the second rotary angle, measured by the second rotary angle sensor, depending on the position of the first and second rotary angle sensor, in particular of the individual rotary angle sensors. For example, a first part of the torque is assigned to an internal torque of the crankshaft because of ignition forces of individual cylinders; and/or a second part of the torque is assigned to a usable torque, wherein the first and/or second part of the torque is obtained after a filter or similar downstream signal processing.

Depending on the position of the individual rotary angle sensors, the internal torque on the basis of ignition forces of individual cylinders and/or the usable torque can be filtered out by suitable difference creation of the rotary angle (twist angle) by way of downstream signal processing.

Due to ongoing knowledge of the internal torque and the usable torque, the engine control can be improved in particular in regard to acceleration or braking of the piston engine during running operation of the piston engine.

In a further development it is provided that torsional vibration measurements are conducted on the piston engine by way of the torque sensors.

Torsional vibration measurements are possible in all piston engines that are equipped with the inventive torque sensor system without having to apply additional measuring technology. This is particularly relevant in bench test trials, or in field conducted measurements in the case of equipment problems, which is generally associated with high individual incident costs.

In a further development a status of the piston engine is monitored by way of the repeatedly determined cylinder-associated torques, in particular in such a way that predictive maintenance and/or early damage detection can be implemented.

As a result, needs-based maintenance of the piston engine—for example in regard to engine wear—is possible. Troubleshooting in the event of a defect in the piston engine can also be improved and components be replaced in a targeted manner. In particular, continuous detection of performance data facilitates early defect detection, so that an impending failure of a component can be responded to in a timely manner.

An additional development provides that the performance data is transmitted to an interface for continuous monitoring of same.

The interface herein can be a user interface and can be located in the piston engine, so that internal monitoring of the performance data by the user is possible. The user interface can, however, also be located outside the piston engine, so that external monitoring of the performance data of one or several piston engine is feasible. Software controlled monitoring of the performance data is also conceivable.

The invention moreover relates to a piston engine, in particular an internal combustion engine, for example a piston engine with an electric machine, in particular a generator or motor, for example in the embodiment of a hybrid drive. The piston engine includes a number of cylinders, as well as a crankshaft mounted in main bearings, with a number of offsets and shaft journals and which— under torque loading of the crankshaft—converts a movement of the piston in one of the cylinders of the number of cylinders by way of a piston connecting rod that is attached to an offset of the crankshaft into a rotational movement, under torsion-related deformation of the torsion-loaded crankshaft; and a torque sensor system assigned to the crankshaft having at least one first and one second rotary angle sensor. The first and the second rotary angle sensor are part of a number of rotary angle sensors, spaced apart from one another which measure a first and a second rotary angle at the crankshaft. The first and second rotary angle sensors are spaced apart from one another over a spacing region of the crankshaft, wherein the first and the second rotary angle are associated with the spacing region of the crankshaft. An offset calculator determines an angle offset between the first and second rotary angle which results from the torsion-induced deformation of the torque-loaded crankshaft. The piston engine is characterized in that the spacing region is limited along the crankshaft to a section of the distance between the main bearings, and the section comprises a subgroup of the number of offsets and shaft journals. The piston engine is further characterized in that the first and second rotary angle sensors are magnetosensitive, in particular magnetoresistive and/or magnetoelastic sensors, in such a way that the angle offset of the subgroup can be assigned to the number of offsets and shaft journals.

BRIEF DESCRIPTION OF THE DRAWINGS

Embodiments of the invention are described below with reference to drawings relating to a piston engine with a crankshaft. Examples shown in the drawings are not necessarily to scale, but for the purpose of explanation are in schematic and/or slightly distorted form. In view of additions to the teachings directly recognizable from the drawings, reference is made to the relevant state of the art. It must be considered that diverse modifications and changes in design and detail can be made to an embodiment without deviating from the general concept of the invention. The characteristics of the invention disclosed in the description, in the drawings and in the claims can be fundamental individually or also in any desired combination for further development of the invention. In addition, all combinations of at least two features disclosed in the description, the drawings and/or the claims fall within the scope of the invention. The general concept of the invention is not limited to the exact design or detail of the exemplary embodiment illustrated and described below or limited to a subject which would be limited in comparison to subject matter claimed in the claims. In regard to stated dimensional ranges, values within the stated limits should also be disclosed as threshold values and can be used and claimed as desired. Additional advantages, features and details of the invention are apparent from the following description of the embodiments as well as from the schematic drawings:

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
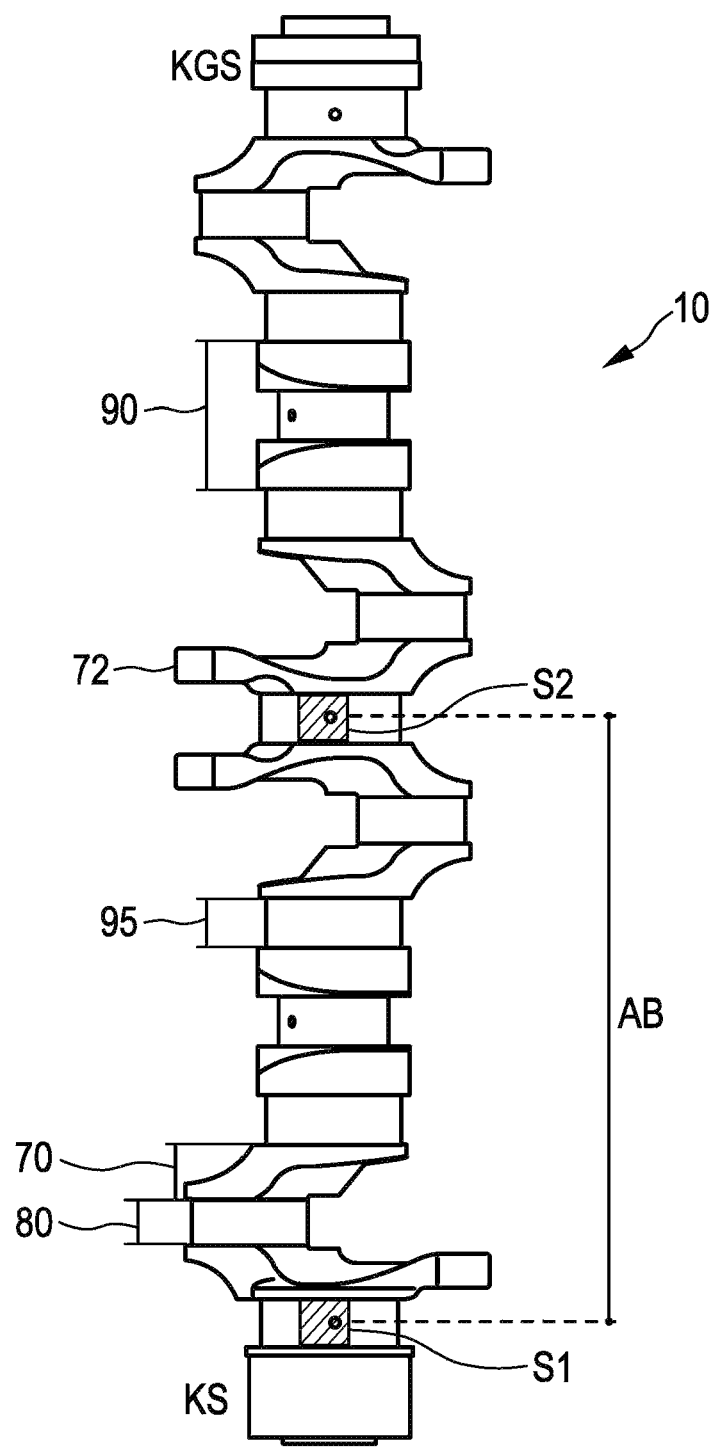
FIG. 1 is a schematic view of a crankshaft in the example of an in-line engine.

FIG. 1 illustrates a crankshaft 10 of an in-line engine. Crankshaft 10 is mounted in main bearings (not shown) on power side KS and on the side opposite KGS the power side. The total length of the crankshaft thus extends to the distance between the main bearings (not shown). Crankshaft 10 comprises a number of offsets 90 and shaft journals 95. An offset 90 comprises crank arms 70 and a crank journal 80. In addition, counterweights 72 are provided in order to move the center of mass of crankshaft 10 preferably to the rotational axis of crankshaft 10. In an in-line engine, one cylinder respectively is attached to each offset 90 by way of a piston connecting rod (not shown). Also, a spacing region AB is shown which is defined by the distance of a first rotary angle sensor S1 and a second rotary angle sensor S2 and which is assigned thereto. According to the concept of the invention, first rotary angle sensor S1 and second rotary angle sensor S2 and possible additional rotary sensors are magnetosensitive, and in the present example namely predominantly magnetoresistive rotary angle sensors. Spacing region AB extends along crankshaft 10 and is limited to a partial region of the distance between the main bearings. The partial region includes a subgroup of the number of offsets 90 and shaft journals 95.

Figure 2:
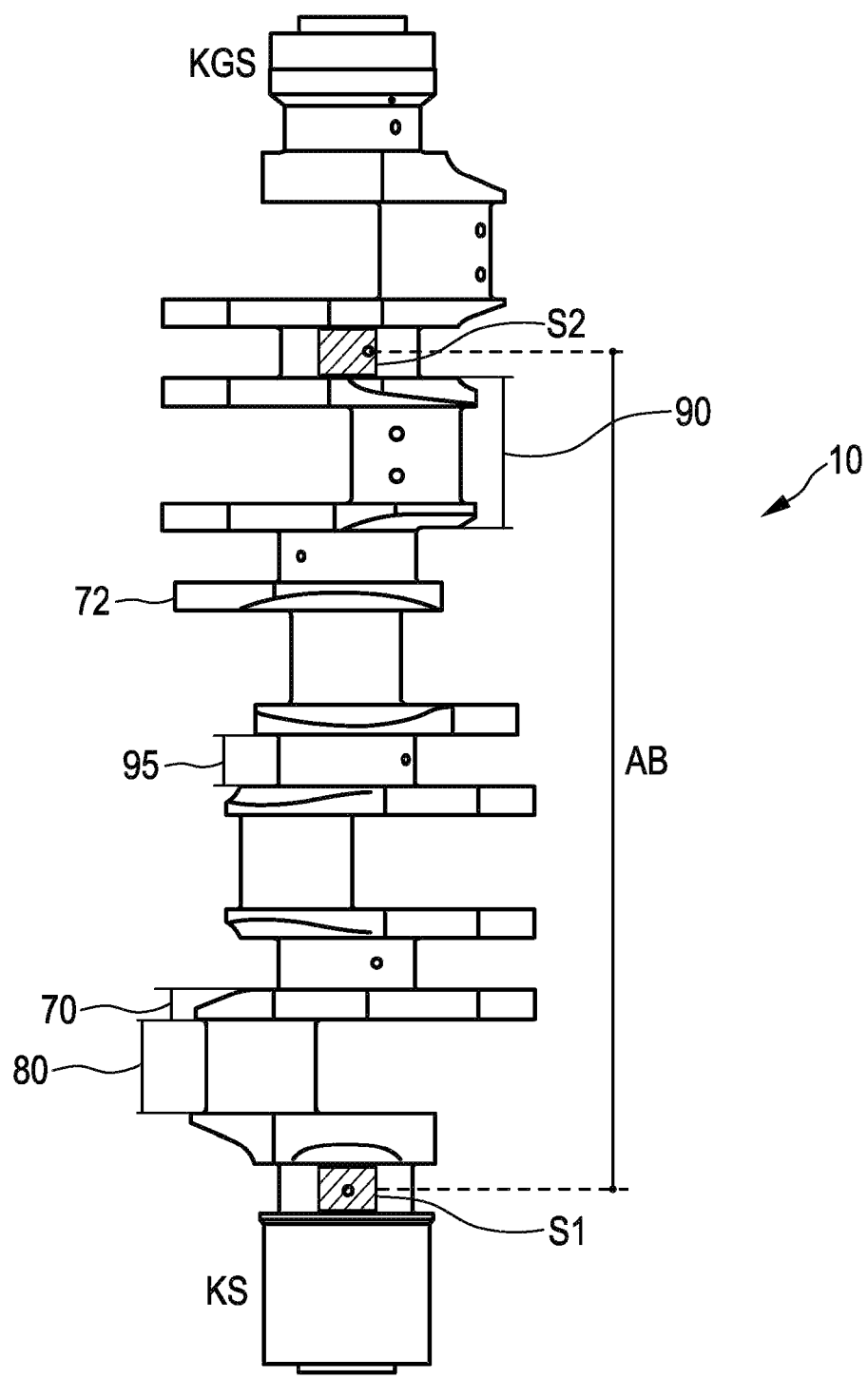
FIG. 2 is a schematic view of crankshaft in the example of a V-engine.

FIG. 2 shows a crankshaft 10 of a V-engine. Crankshaft 10 is mounted in main bearings (not shown) on power side KS and on side opposite power side KGS. As also described with reference to FIG. 1, the overall length of the crankshaft thus extends to the distance between the main bearings (not shown). Crankshaft 10 has a number of offset 90 and shaft journals 95. One offset 90 comprises crank arms and one crank journal 80. Furthermore, counterweights 72 are provided in order to move the center of mass of crankshaft 10 preferably to the rotational axis of crankshaft 10. In a V-engine, two cylinders respectively are attached to each offset 90 by way of a piston connecting rod (not shown). Also, a spacing region AB is shown which is defined by the distance of a first rotary angle sensor S1 and a second rotary angle sensor S2 and which is assigned thereto. According to the concept of the invention, first rotary angle sensor S1 and second rotary angle sensor S2 and possible additional rotary sensors are magnetosensitive, and in the present example namely predominantly magnetoresistive rotary angle sensors. Spacing region AB extends along crankshaft 10 and is limited to a partial region of the distance between the main bearings. The partial region includes a subgroup of the number of offsets 90 and shaft journals 95.

Figure 3:
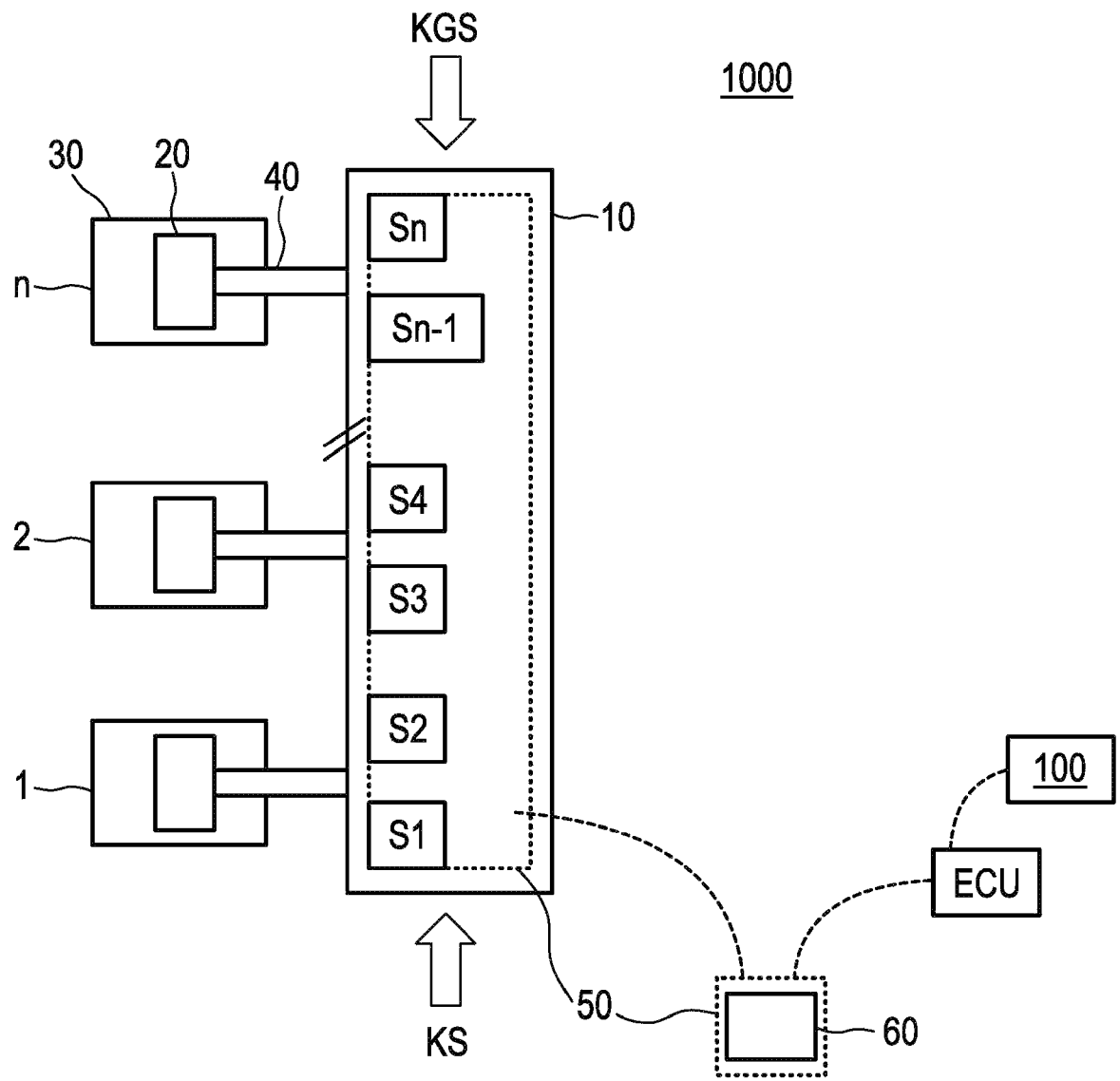
FIG. 3 is a schematic view of a crankshaft with cylinder-associated rotary angle sensors in the example of an in-line engine.

FIG. 3 is a schematic illustration of a piston engine 1000 in a series-arrangement with a crankshaft 10. The power side is herein identified with KS, and KGS denotes the opposite side to the power side of the motor. A number of cylinders (l-n) are located on the one side of the engine. A piston 20 moves in each individual cylinder 30 and by way of a piston connecting rod 40 causes a rotational movement of crankshaft 10. The piston engine moreover comprises a torque sensor system 50 with a number of cylinder-associated rotary angle sensors S1, S2, . . . Sn. In this case two rotary angle sensors are in particular assigned to one cylinder. These measure the torsion-induced load of torque-loaded crankshaft 10 during operation of piston engine 1000 and transmit cylinder-assigned rotary angles to an offset calculator 60, which calculates cylinder-associated torques from an angular offset between the two rotary angles. First rotary angle sensor S1 and second rotary angle sensor S2 and the other rotary angle sensors herein are magnetosensitive, namely magnetoresistive rotary angle sensors. In principle, they can also be magnetoelastic rotary sensors. However, the magnetosensitive rotary angle sensors S1, S2 may comprise an AMT sensor, a Hall sensor, a GMR sensor, a magnetoelastic sensor, a magnetostrictive sensor, and/or an inverse-magnetorestrictive sensor. The engine control unit (ECU) controls and regulates piston engine 1000 on the basis of the calculated torques. Transmission of the cylinder-specific rotary angles to offset calculator 60 is illustrated by a dashed line. A transmission of the cylinder-specific torques to the symbolically illustrated engine control unit (ECU) is also advantageously provided, so that regulating of motor 100 can occur based on the cylinder-specific torques.

Figure 4:
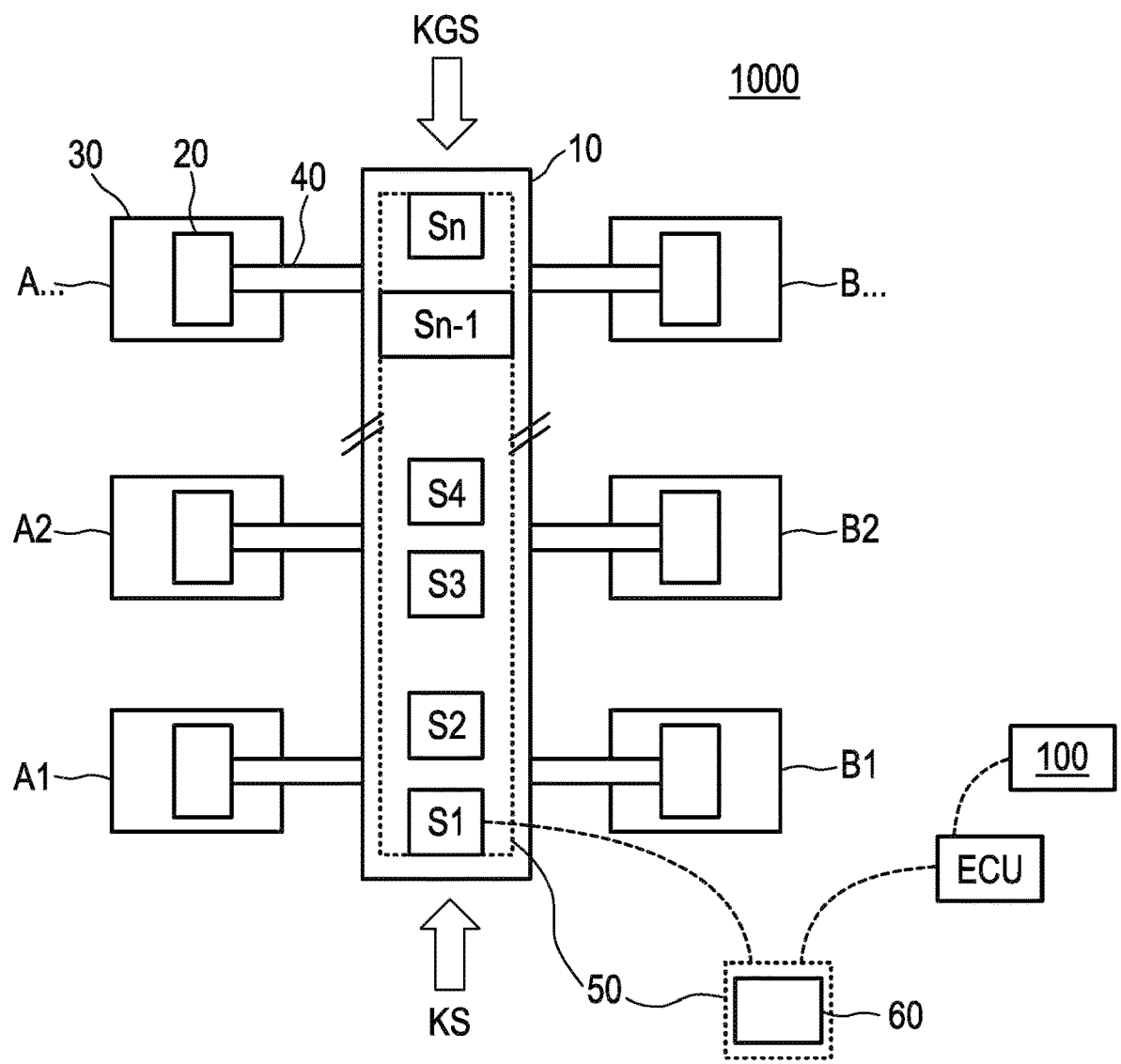
FIG. 4 is a schematic view of a crankshaft with cylinder-associated rotary angle sensors in the example of a V-engine.

FIG. 4 is a schematic representation of a piston engine 1000 in a V-arrangement with a crankshaft 10. The power side is herein identified with KS and KGS denotes the opposite side to the power side of the motor. On the left engine side, a number of cylinders A1-An are located, and B1-Bn identifies a number of cylinders on the right engine side. A piston 20 moves in each individual cylinder 30 and by way of a piston connecting rod 40 causes a rotational movement of crankshaft 10. The internal combustion engine moreover comprises a torque sensor system 50 having a number of rotary angle sensors S1, S2, . . . , Sn which are assigned to an offset. In particular, two rotary angle sensors are herein assigned to an offset respectively. First rotary angle sensor S1 and second rotary angle sensor S2 and the other rotary angle sensors are herein according to the concept of the invention magnetosensitive, namely magnetoresistive rotary angle sensors. In principle, they can also be magnetoelastic rotary sensors. Since in each case two pistons are attached via piston connecting rods to an offset, rotary angle sensors assigned to an offset have accordingly two cylinders assigned to them. The rotary angle sensors measure the torsion-induced load of torque-loaded crankshaft 10 during operation of piston engine 1000 and transmit rotary angles assigned to a respective offset to an offset calculator 60 which—from an angular offset between the two rotary angles—then calculates a torque that is assigned to a respective offset. The engine control unit (ECU) controls and regulates piston engine 1000 on the basis of the calculated torques. The transmission of the offset-specific rotary angles to offset calculator 60 is represented by a dashed line. Transmission of the offset-specific torques to the symbolically illustrated engine control unit (ECU) is correspondingly provided, so that regulating of motor 100 can occur based on the offset-specific torques.

Figure 5A:
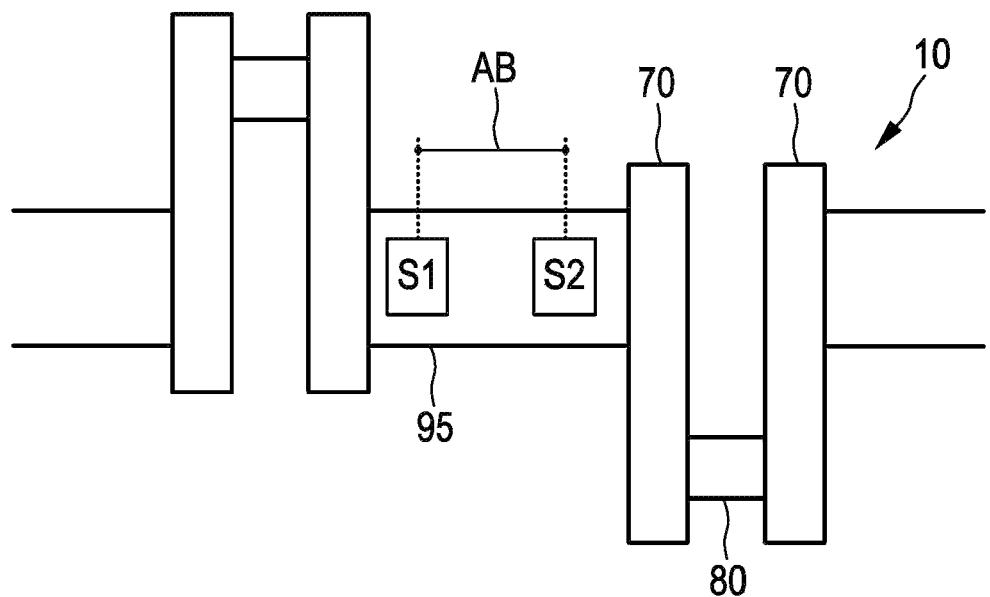
FIG. 5a is a schematic view of a crankshaft with two rotary angle sensors which are respectively arranged on a shaft journal.
Figure 5B:
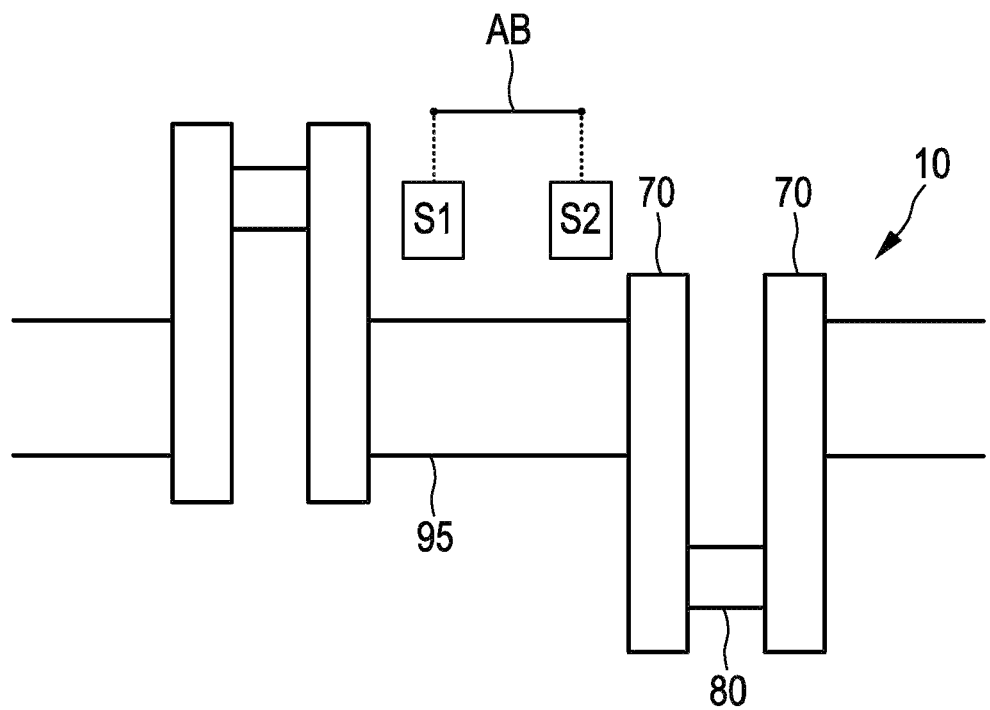
FIG. 5b is a schematic view of a crankshaft with two rotary angle sensors which are respectively arranged above a shaft journal.

FIG. 5a and FIG. 5b are schematic representations of a crankshaft 10. Between the offsets of two crank arms 70 and a crank journal 80, a shaft journal 95 of crankshaft 10 is respectively located. On the shaft journals in FIG. 5a, two rotary angle sensors S1 and S2 are arranged in contact with crankshaft 10 in a spacing region AB at a distance from one another, in order to measure an angular offset from the torsion-induced deformation of crankshaft 10. In FIG. 5 b it is indicated that also contactless scanning of crankshaft 10 is provided, in that rotary angle sensors S1, S2 are arranged at a distance above the crankshaft in a spacing region AB, at a distance from one another. According to the concept of the invention, first rotary angle sensor S1 and second rotary angle sensor S2 and possible additional rotary sensors are magnetosensitive, namely magnetoresistive rotary angle sensors. In principle, they can also be magnetoelastic rotary sensors.

Figure 6A:
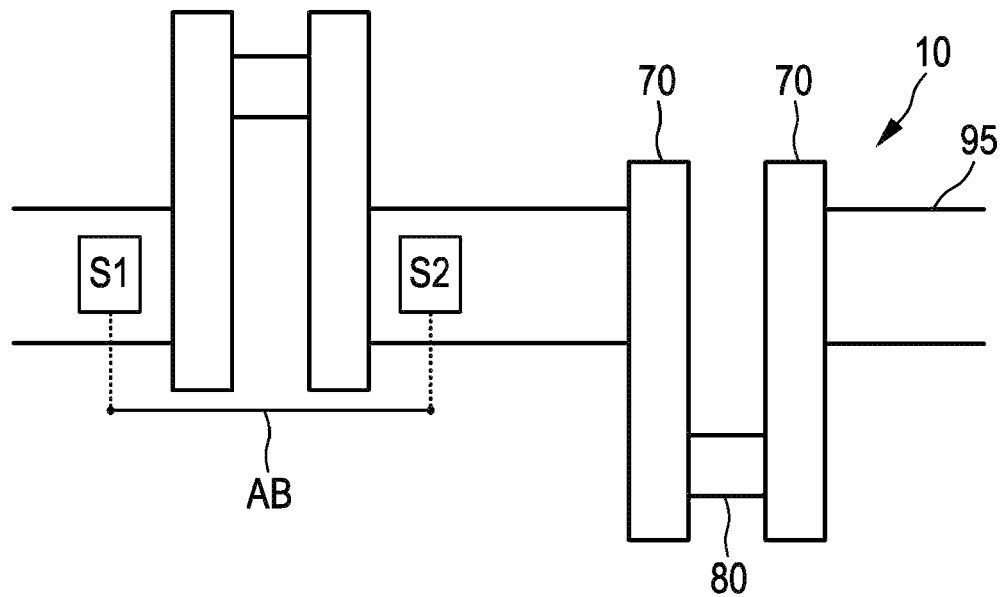
FIG. 6a is a schematic view of a crankshaft with two rotary angle sensors arranged on the shaft and in between an offset of the crankshaft.
Figure 6B:
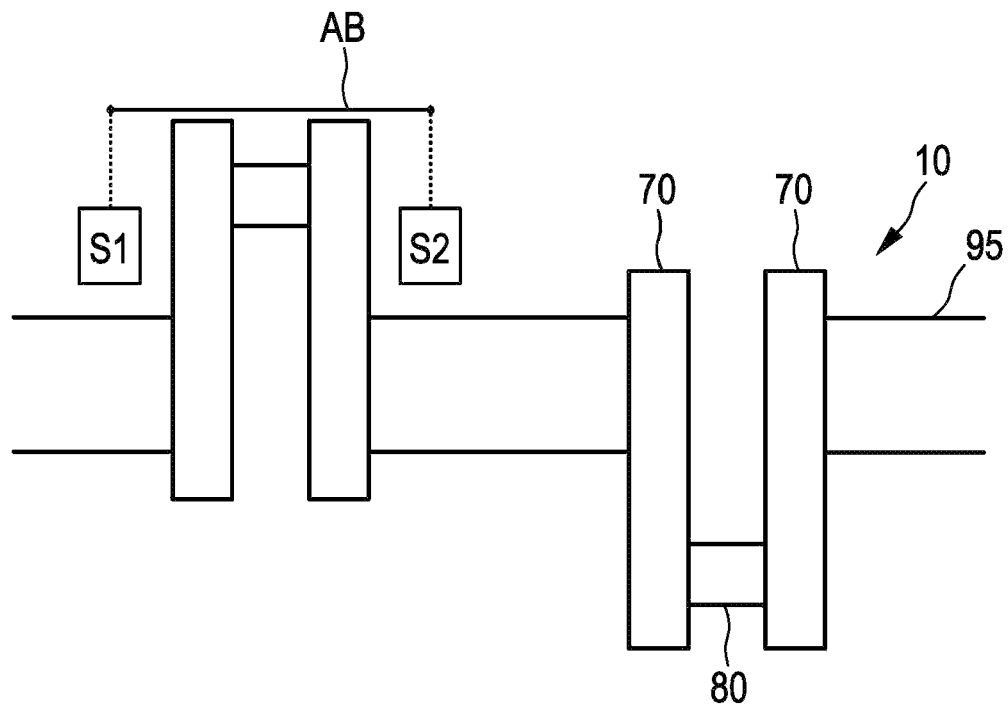
FIG. 6b is a schematic view of a crankshaft with two rotary angle sensors located between an offset of the crankshaft.

FIG. 6a and FIG. 6b show schematic representations of a crankshaft 10. In front or behind an offset consisting of two crank arms 70 and one crank journal, one of the rotary angle sensors S1 and S2 respectively are mounted. In FIG. 6a rotary angle sensors S1 and S2 are arranged in contact with crankshaft 10 in a spacing region AB, at a distance from one another, in order to measure an angular offset from the torsion-induced deformation of crankshaft 10. In FIG. 6b it is indicated that also contactless scanning of crankshaft 10 is provided, in that rotary angle sensors S1, S2 are arranged at a distance above the crankshaft in a spacing region AB, at a distance from one another. One of the corresponding rotary angle sensors S1, S2 is arranged at a distance above the crankshaft in front of an offset and the other one is arranged behind the offset. According to the concept of the invention, first rotary angle sensor S1 and second rotary angle sensor S2 and possible additional rotary sensors are magnetosensitive, namely magnetoresistive rotary angle sensors. In principle, they can also be magnetoelastic rotary sensors.

Figure 7A:
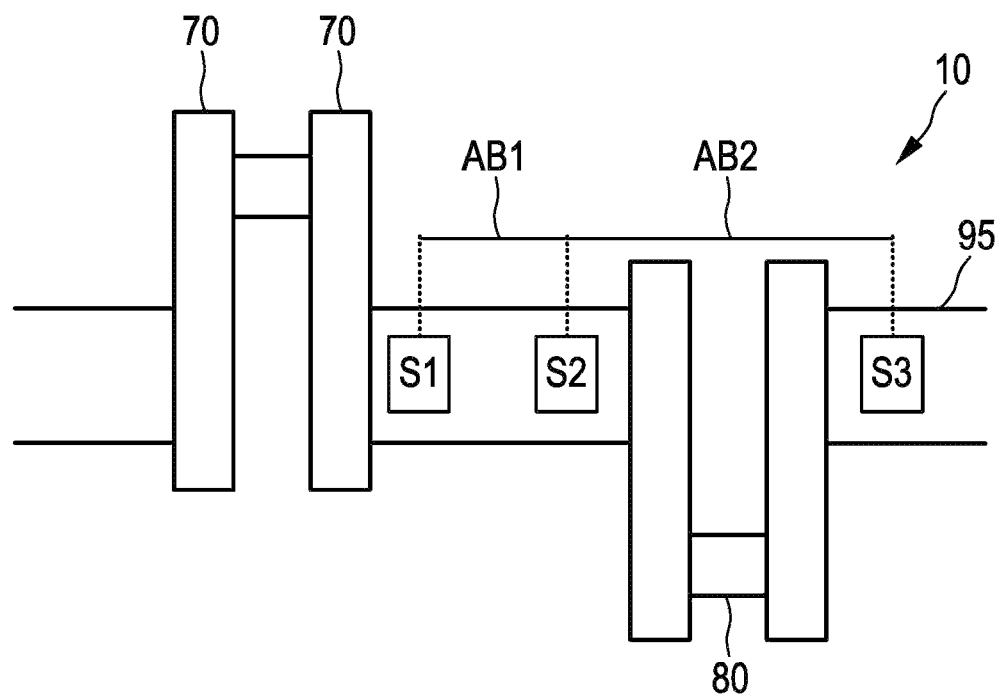
FIG. 7a is a schematic view of a crankshaft with three rotary angle sensors arranged on the shaft and assigned to one offset of the crankshaft.
Figure 7B:
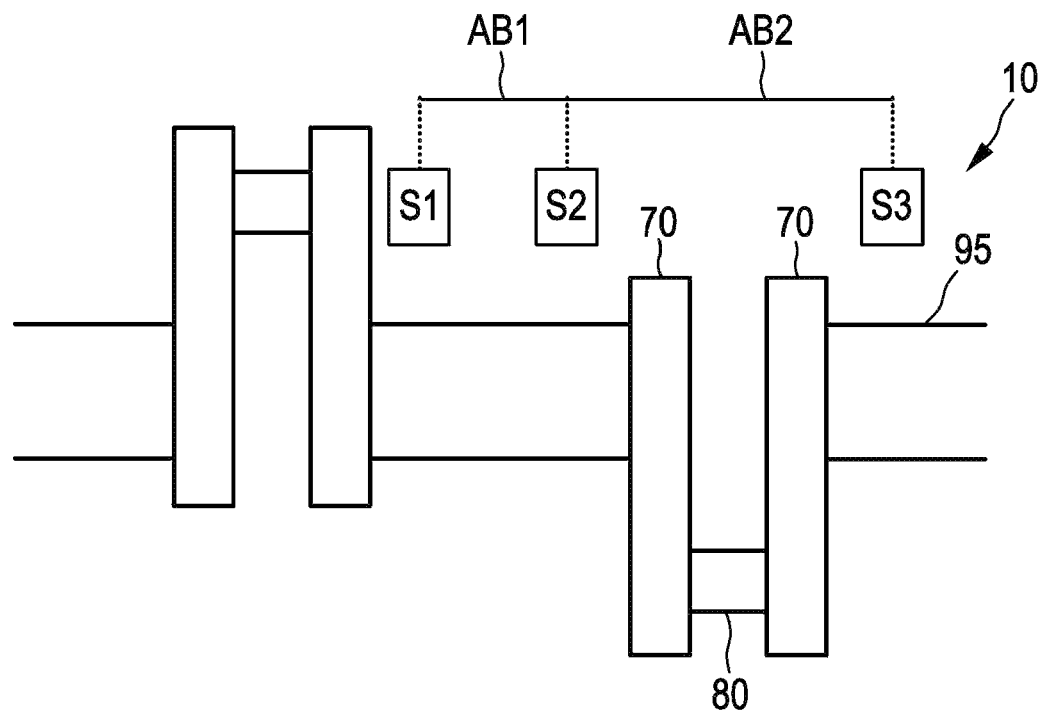
FIG. 7b is a schematic view of a crankshaft with three rotary angle sensors, assigned to one offset.

FIG. 7a and FIG. 7b show schematic representations of a crankshaft 10. In FIG. 7a it is indicated that several rotary angle sensors S1, S2 and S3 can be assigned to one offset. Each of the rotary angle sensors S1, S2 and S3 measures a rotary angle. The rotary angles of sensors S1 and S2 are allocated to spacing region AB1 and the rotary angles of Sensors S2 and S3 are allocated to spacing region AB2. Spacing regions AB1 and AB2 can be assigned to the same offset, in order to determine an offset-specific torque. The rotary angle of sensor S2 is thus allocated to two spacing regions. Torque determination can for example be based on an average value which is composed of the respective angle offsets of spacing regions AB1 and AB2. In FIG. 7b it is shown that the same rotary angle arrangement can also be arranged at a distance from crankshaft 10 in order to determine a rotary angle of crankshaft 10 in a contactless manner. According to the concept of the invention, first rotary angle sensor S1 and second rotary angle sensor S2 and possible additional rotary sensors are magnetosensitive, and in the present example namely predominantly magnetoresistive rotary angle sensors. In principle, they can also be magnetoelastic rotary sensors.

Figure 8:
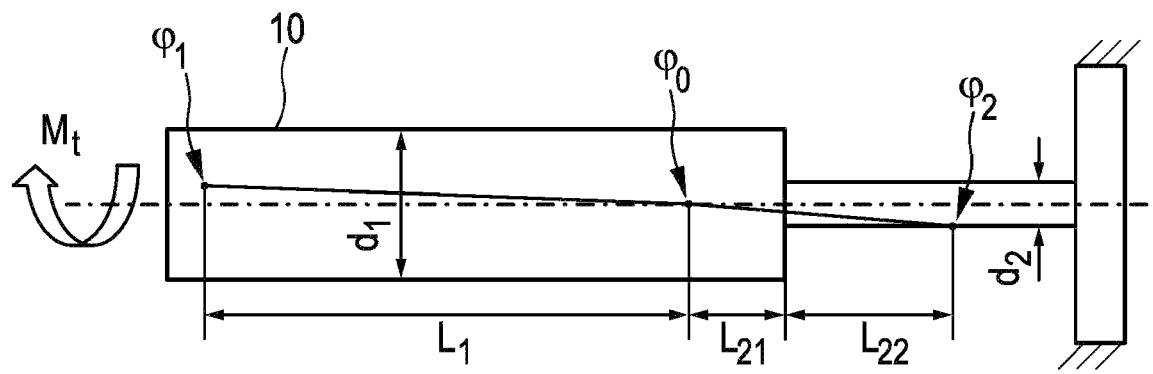
FIG. 8 is a schematic view of a crankshaft with plotted values for calculating torque M of the crankshaft.

FIG. 8 shows a schematic representation of a crankshaft 10 with plotted variables for calculating torque $M_t$ of the crankshaft. This results from $$M_t = (\varphi_1 - \varphi_0) \times (G \times I_{t1})/L_1 = (\varphi_2 - \varphi_0) \times G \times (I_{t1}/L_{21} + I_{t2}/L_{22})$$

wherein G is the shear modulus of the shaft material and wherein the subtraction of the rotary angles $(\varphi_1 - \varphi_0)$ and $(\varphi_2 - \varphi_0)$, subject to the position of the sensors makes it possible to calculate the internal torque or usable torque by way of downstream signal processing. Lengths characteristic for the crankshaft and the arrangement are indicated by $L_1$, $L_{21}$ and $L_{22}$. The torsional moment of inertia of the shaft cross section $L_t$ is obtained for the different thicknesses $d_1$ and $d_2$ of the crankshaft by way of $I_{t1} = \pi d_1/32$ and $I_{t2} = \pi d_2/32$.

Figure 9:
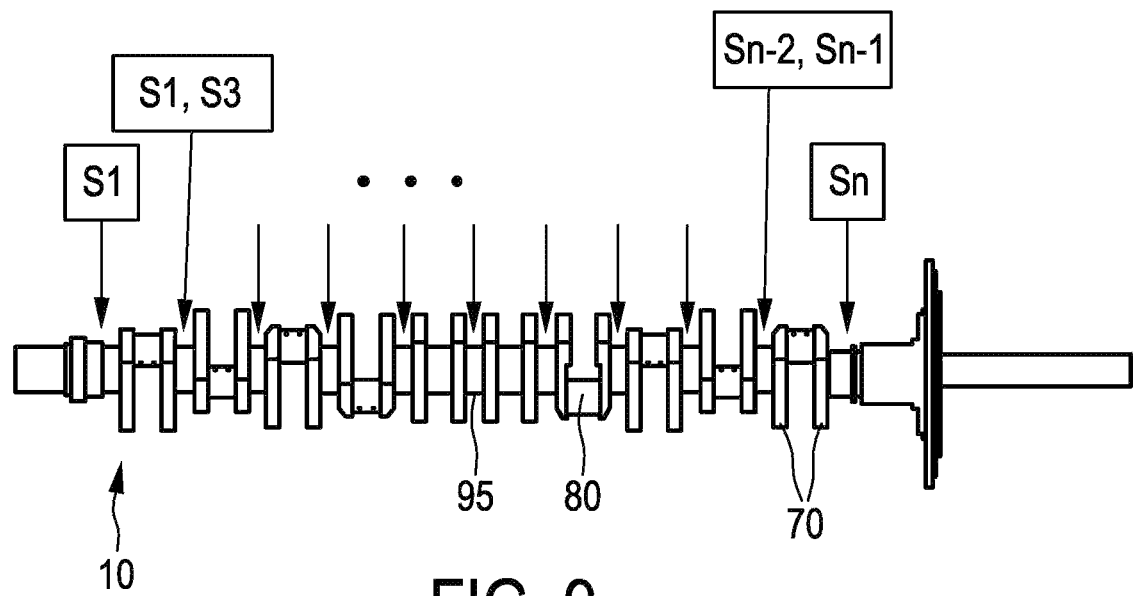
FIG. 9 is a model representation of a crankshaft, indicating positions of the crankshaft.

FIG. 9 shows a model of a crankshaft 10. The vertical arrows point to a shaft journal 95 of the crankshaft, between the offsets which consist of the two crank arms 70 and crank journal 80. Two GMR sensors S1 and S2 respectively from the number of rotary angle sensors S1, S2, . . . Sn can advantageously be mounted at these locations either in contact with the crankshaft or contactless at a distance from the crankshaft in front of or behind an offset and be assigned to the latter. According to the concept of the invention, first rotary angle sensor S1 and second rotary angle sensor S2 and other rotary sensors are magnetosensitive, namely magnetoresistive rotary angle sensors. In principle, they can also be magnetoelastic rotary sensors.

Rotary angle sensors S1 and S2 are for example assigned to one offset, rotary angle sensors S3 and S4 are assigned to one offset, and so on. They can then determine an angle offset for the associated spacing region from which offset-specific torques can then be calculated by the offset calculator. Alternative sensors, for example torque flanges, magnetostrictive sensors or strain gauges can for example be mounted in addition at the beginning or at the end of the crankshaft.

Figure 10:
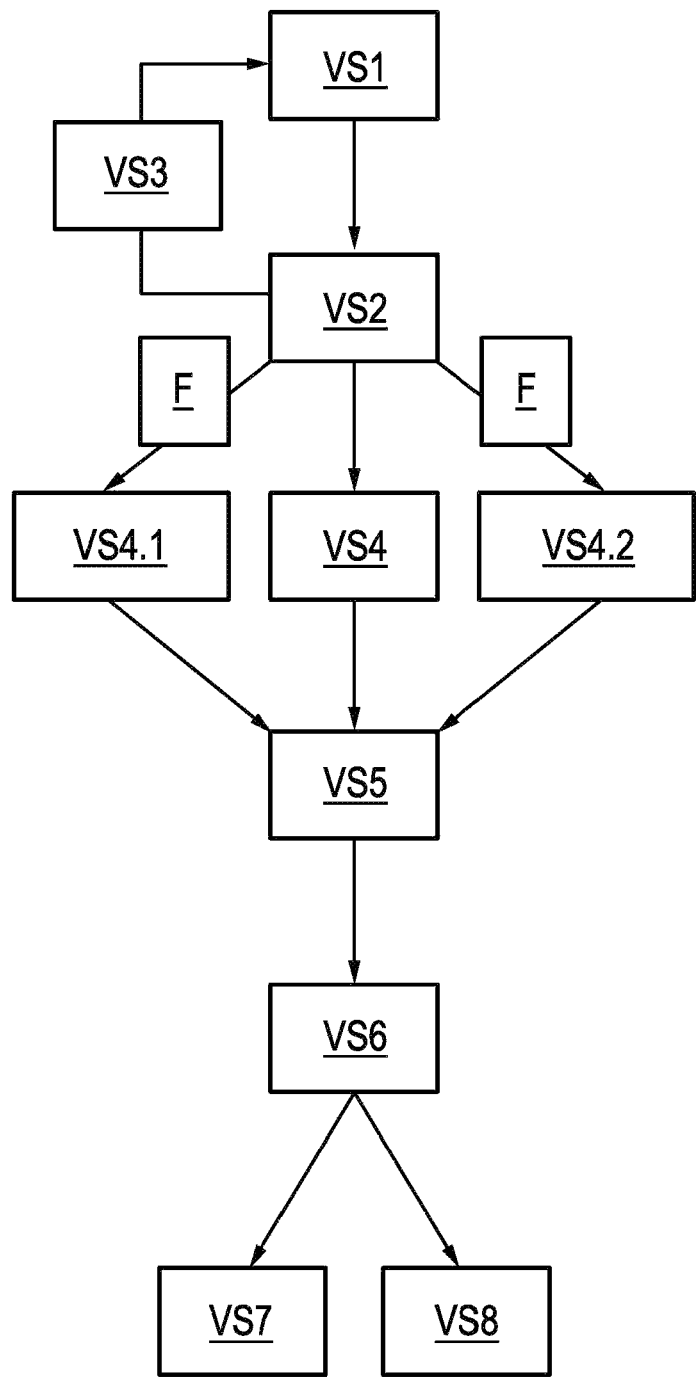
FIG. 10 is a schematic representation of a process flow chart.

FIG. 10 is a schematic representation of the process sequence. The torsion-induced deformation of the crankshaft during operation of the piston engine is initially detected by the rotational angle sensors through measurement of an angular offset VS1. The rotational angle sensors are in contact with the crankshaft or contactless above the crankshaft in such a way and are spaced apart in such a way that a spacing region of the torque-loaded crankshaft is provided between them. At least always one first and one second rotary angle sensor from the number of rotary angle sensors are assigned to the torque sensor system of an offset of the crankshaft, in order to measure an offset-assigned angular offset. This makes detection of torsion distribution along the crankshaft possible. The angular offset is the transmitted to offset calculator VS2. The step of measuring an offset-assigned angular offset and transmission thereof to the offset calculator is continuously repeated VS3 and should occur in particular at least once per operating cycle of the cylinder. An offset related torque is now calculated by the offset calculator from the offset-associated angular offset VS4.

The torque of the crankshaft is thus determined on the basis of the measured angular offset which is determined by calculating the difference between the first rotary angle measured by the first rotary angle sensor and the second rotary angle, measured by the second rotary angle sensor. According to the concept of the invention, first rotary angle sensor S1 and second rotary angle sensor S2 and possible other rotary sensors are magnetosensitive, namely magnetoresistive rotary angle sensors. In principle, they can also be magnetoelastic rotary sensors.

Depending on the location of the first and second rotational angle sensor, in particular of the individual rotary angle sensors, an internal torque and/or a usable torque can be filtered out.

In particular, in VS4.1 a first part of the torque is assigned to an internal torque of the crankshaft due to ignition forces of individual cylinders or pairs of cylinders, and/or a second part of the torque is assigned to a usable torque in VS4.2, wherein the first and/or second part of the torque is obtained through signal processing downstream from a Filter F or the like.

In VS5 the torque and/or the internal torque and/or the usable torque are then transferred as input variables for engine control into the engine control unit (ECU).

Continuous detection of performance data enables VS6 and can be used for example for continuous monitoring of a status of the piston engine, VS7. This enables early detection of damage and predictive maintenance of the piston engine. Moreover, continuous detection of performance data can be used for control tasks, VS8. This enables, in particular improved control of the injection volume which advantageously reduces the pollutant emission of the piston engine, thus allowing emission limits to be permanently maintained.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LISTING

1000 Piston engine
10 crankshaft
20 piston
30 cylinder
40 piston connecting rod
50 torque sensor system
60 offset calculator
70 crank arm
75 counterweight
80 crank journal
90 offset
95 shaft journal
100 motor
AB spacing region
ECU engine control unit
A1-An cylinder of left engine side
B1-Bn cylinder of left engine side
AS drive-/output side
F filter
KS power side
KGS side opposite power side
VS1 process step 1
VS2 process step 2
VS3 process step 3
VS4 process step 4
VS4.1 process step 4.1
VS4.2 process step 4.2
VS5 process step 5
VS6 process step 6
VS7 process step 7
VS8 process step 8
Mt torque
$\varphi_{0,1,2}$ rotary angle
$L_{1,21,22}$ lengths along the crankshaft
$d_{1,2}$ thicknesses of the crankshaft
G shear modulus
$I_{t,t1,t2}$ torsional moment of inertia
S1, S2, S3 magnetosensitive, in particular magnetoresistive and/or magnetoelastic rotary angle sensors

What is claimed is:

1. A method for operating an internal combustion engine, comprising:
providing a piston engine including a number of cylinders, at least one piston in one cylinder of the number of cylinders, and a crankshaft mounted with bearing journals in main bearings, the crankshaft having a number of offsets and a number of shaft journals in alternating sequence between the bearing journals, the crankshaft converting a movement of the at least one piston through absorption of the load by at least one piston connecting rod which is arranged on an offset of the crankshaft, into a rotational movement, and due to the load absorption, the crankshaft experiences at least one of a torsion-causing deformation and tension, and the piston engine further including a torque sensor system assigned to the crankshaft, the torque sensor system including at least one first rotary angle sensor and at least one second rotary angle sensor, the at least one first rotary angle sensor and the at least one second rotary angle sensor being magnetosensitive sensors, the at least one first rotary angle sensor and the at least one second rotary angle sensor being part of a number of rotary angle sensors which are spaced apart from one another and which respectively and directly measure a first rotary angle of torsion and a second rotary angle of torsion of the crankshaft in such a way that the at least one first rotary angle sensor and the at least one second rotary angle sensor are spaced apart from one another over a spacing region of the crankshaft;
measuring the first rotary angle and the second rotary angle in the spacing region; and
determining an angular offset between the first rotary angle and the second rotary angle, which angular offset results from the torsion of the loaded crankshaft wherein the spacing region is limited along the crankshaft to an actual partial region of the spacing between the bearing journals, and the partial region includes an actual subgroup of at least one of the number of offsets and the number of shaft journals, so that the angular offset is assigned to the actual subgroup.

2. The method according to claim 1, wherein the angular offset between first rotary angle and the second rotary angle is determined by an offset calculator in such a way that a torque which is assigned to the spacing region and which results from the measured first and second rotary angle can be determined, wherein the torque assigned to the spacing region is determined during running operation of the piston engine, wherein the torque assigned to the spacing region is determined repeatedly during running operation of the piston engine.

3. The method according to claim 1, wherein the spacing region is limited to at least one of:
at least one shaft journal region, comprising at least one shaft journal in between a first offset and a second offset; and
at least one offset region, comprising at least one offset in such a way that, the angular offset is assignable to at least one of the at least one shaft journal and the at least one offset.

4. The method according to claim 1, wherein the spacing region is limited to at least one of:
a single region shaft journal, comprising a single shaft journal in between a first offset and a second offset; and
a single region offset, comprising a single offset in such a way that the angular offset is assignable to at least one of the single shaft journal and the single offset.

5. The method according to claim 1, wherein the number of rotary angle sensors which include the at least one first rotary angle sensor and the at least one second rotary angle sensor are spaced apart and located above the spacing region, wherein the number of rotary angle sensors are magnetosensitive sensors.

6. The method according to claim 1, wherein the number of spaced apart rotary angle sensors comprise a plurality of pairs of first rotary angle sensors and second rotary angle sensors between the main bearings, wherein the rotary angle sensors of the pairs are respectively spaced apart from one another over a single region, the single region being at least one of a shaft journal single region and an offset single region of the crankshaft.

7. The method according to claim 1, further including repeatedly determining a torque, associated with the spacing region, during running operation of the piston engine, and that, for repeated determination of the torque that is assigned to the spacing region of the crankshaft, a torsion induced load on the crankshaft is detected continuously at least once per operating cycle of a cylinder.

8. The method according to claim 1, further including continually at least one of controlling and monitoring fuel injection, due to repeated determination of a torque allocated to the spacing region by an engine control unit, in such a way that a usable torque is determined.

9. The method according to claim 1, further including at least one of controlling and monitoring a fuel injection into a specific cylinder which—by way of a piston connecting rod—is attached to an offset which is included in the spacing region or which adjoins the spacing region, for reducing the pollutant emission of the piston engine and/or for permanent compliance with emission limits.

10. The method according to claim 1, wherein a torque assigned to the spacing region is detected via repeated torque measurements during running operation of the piston engine, even at speeds above 2000 rpm, including speeds above 6000 rpm.

11. The method according to claim 1, wherein the first rotary angle and the second rotary angle are measured directly at the crankshaft, in that the crankshaft is free of a magnetic encoder and/or is uncoded.

12. The method according to claim 1, wherein the at least one first rotary angle sensor and the at least one second rotary angle sensor are not in contact with the crankshaft so that a contactless determination of the first rotary angle and the second rotary angle that are assigned to the spacing region occurs.

13. The method according to claim 1, wherein the at least one first rotary angle sensor and the at least one second rotary angle sensor are arranged in contact with and directly on the crankshaft.

14. The method according to claim 1, wherein the magnetosensitive sensors comprise at least one of an AMT sensor, a Hall sensor, a GMR sensor, a magnetoelastic sensor, a magnetostrictive sensor, and an inverse-magnetorestrictive sensor.

15. The method according to claim 1, wherein the torque sensor system further includes one or several sensors from a group including a torque flange, a strain gauge, a magnetoresistor sensor, and a sensor having a magnetooptical layer.

16. The method according to claim 1, wherein a torque of the crankshaft is determined on the basis of the angle offset which is determined by creating a difference between the first rotary angle, measured by the at least one first rotary angle sensor, and the second rotary angle, measured by the at least one second rotary angle sensor, in particular depending on a position of the at least one first rotary angle sensor and the at least one second rotary angle sensor, in particular of individual additional rotary angle sensors.

17. The method according to claim 1, wherein at least one of:
a first part of the torque is assigned to an internal torque of the crankshaft; and
a second part of the torque is assigned to a usable torque.

18. The method according to claim 1, wherein a torque is assigned to at least one of a first part of the torque and a second part of the torque via signal processing downstream from a Filter or the like, wherein at least one of:
the first part of the torque, in particular the internal torque, is used for monitoring or early damage control; and
the second part of the torque, in particular the usable torque, is used for engine control.

19. The method according to claim 1, further including conducting torque vibration measurements on the piston engine by the torque sensor system.

20. The method according to claim 1, wherein by way of repeatedly determined torques that are associated with the spacing region, a status of the piston engine is monitored, so that at least one of predictive maintenance and early defect detection can be facilitated.

21. The method according to claim 1, further including transmitting performance data to an interphase for continuous monitoring of the piston engine.

22. The method according to claim 1, wherein operating the piston engine occurs with an electric machine, the electric machine being in the form of at least one of a generator and a motor.

23. A piston engine, comprising:
an electric machine in the form of at least one of a generator and a motor;
a number of cylinders;
at least one piston in one cylinder of the number of cylinders;
a crankshaft mounted with bearing journals in main bearings, the crankshaft furthermore having a number of offsets and a number of shaft journals in alternating sequence between the bearing journals, the crankshaft converting a movement of the at least one piston through absorption of a load by at least one piston connecting rod which is arranged on an offset of the crankshaft, into a rotational movement, and due to the load absorption, the crankshaft experiences at least one of a torsion-causing deformation and a tension; and
a torque sensor system assigned to the crankshaft, the torque sensor system including at least one first rotary angle sensor and at least one second rotary angle sensor, the at least one first rotary angle sensor and the at least one second rotary angle sensor being magnetosensitive sensors, the at least one first rotary angle sensor and the at least one second rotary angle sensor being part of a number of rotary angle sensors which are spaced apart from one another and which respectively and directly measure a first rotary angle and a second rotary angle of torsion of the crankshaft in such a way that the at least one first rotary angle sensor and the at least one second rotary angle sensor are spaced apart from one another over a spacing region of the crankshaft,
wherein the first rotary angle and the second rotary angle can be measured in the spacing region,
wherein an angular offset can be determined between the first and the second rotary angle, which angular offset results from a torsion of loaded crankshaft, and
wherein the spacing region between the at least one first rotary angle sensor and the at least one second rotary angle sensor is limited along the crankshaft to an actual partial region of the spacing between the bearing journals, and the partial region includes an actual subgroup of at least one of the number of offsets and the number of shaft journals, so that the angular offset is assigned to the actual subgroup.

24. A hybrid drive, comprising:
a piston engine, including
an electric machine in the form of at least one of a generator and a motor;
a number of cylinders;
at least one piston in one cylinder of the number of cylinders;
a crankshaft mounted with bearing journals in main bearings, the crankshaft furthermore having a number of offsets and a number of shaft journals in alternating sequence between the bearing journals, the crankshaft converting a movement of the at least one piston through absorption of a load by at least one piston connecting rod which is arranged on an offset of the crankshaft, into a rotational movement, and due to the load absorption, the crankshaft experiences at least one of a torsion-causing deformation and a tension; and a torque sensor system assigned to the crankshaft, the torque sensor system including at least one first rotary angle sensor and at least one second rotary angle sensor, the at least one first rotary angle sensor and the at least one second rotary angle sensor being magnetosensitive sensors, the at least one first rotary angle sensor and the at least one second rotary angle sensor being part of a number of rotary angle sensors which are spaced apart from one another and which respectively and directly measure a first rotary angle and a second rotary angle of torsion of the crankshaft in such a way that the at least one first rotary angle sensor and the at least one second rotary angle sensor are spaced apart from one another over a spacing region of the crankshaft, wherein the first rotary angle and the second rotary angle can be measured in the spacing region, wherein an angular offset can be determined between the first and the second rotary angle, which angular offset results from a torsion of loaded crankshaft, and wherein the spacing region between the at least one first rotary angle sensor and the at least one second rotary angle sensor is limited along the crankshaft to an actual partial region of the spacing between the bearing journals, and the partial region includes an actual subgroup of at least one of the number of offsets and the number of shaft journals, so that the angular offset is assigned to the actual subgroup.

* * * * *